C. L. W. HUSER.
MOTOR CYCLE FRAME.
APPLICATION FILED NOV. 20, 1908.
948,507.
Patented Feb. 8, 1910.
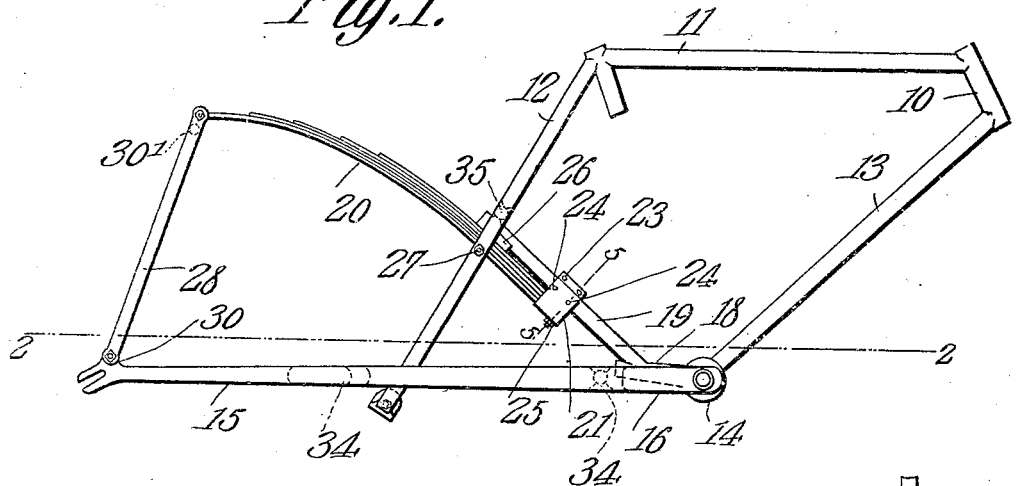
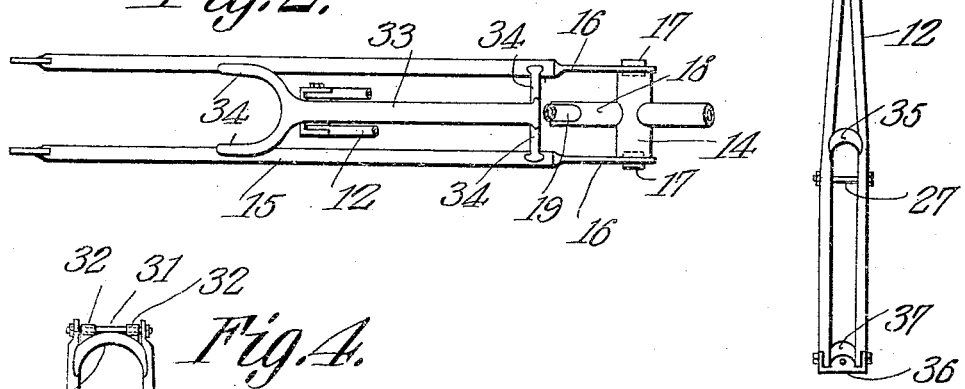
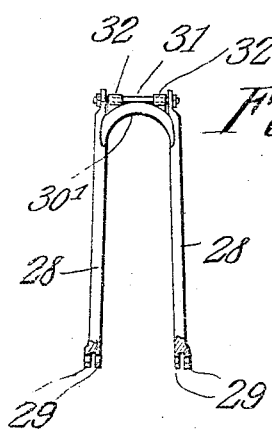
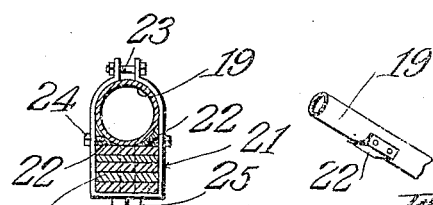
Witnesses
Inventor,
Carl L. W. Huser,
By
Attorneys

UNITED STATES PATENT OFFICE.

CARL L. W. HUSER, OF SAN ANTONIO, TEXAS.

MOTOR-CYCLE FRAME.

948,507.  Specification of Letters Patent.  Patented Feb. 8, 1910.

Application filed November 20, 1908. Serial No. 463,656.

*To all whom it may concern:*

Be it known that I, CARL L. W. HUSER, a citizen of the United States, residing at San Antonio, in the county of Bexar and State of Texas, have invented a new and useful Motor-Cycle Frame, of which the following is a specification.

The object of the present invention is to provide a spring frame for motor cycles, which frame will effectually eliminate all shock, jarring, etc., due to the roughness of streets or roads, and which will make the machine easier to steer, and more comfortable to ride.

The invention also has for its object to provide a frame possessing great strength, in order that it may successfully withstand the strain to which it may be subject.

The above, as well as other advantages, will be apparent when the following detailed description is read in connection with the accompanying drawings.

In the drawings:—Figure 1 is a side elevation of the frame: Fig. 2 is a horizontal section on the line 2—2 of Fig. 1. Figs. 3 and 4 are end views of certain portions of the frame detached. Fig. 5 is an enlarged cross section on line 5—5 of Fig. 1. Fig. 6 is a detail in perspective.

Referring more particularly to the drawings, 10 denotes the head of the frame; 11, the upper reach extending to the rear stay 12; and 13 is the lower reach extending to the crank hanger 14. The rear fork 15, which carries the rear wheel is pivotally connected to the crank hanger, so as to swing in a vertical plane. The purpose of this construction will be presently described. At the front end of the fork, flat pieces 16 of steel, rounded at their inner ends, are brazed into the tubing forming the fork, and these pieces are fitted with bushings 17, in which the crank shaft is adapted to turn.

From the crank hanger 14 a short piece of tubing 18 extends rearwardly, to which tubing is brazed an upwardly and rearwardly extending tubular stem 19, which is for the purpose of fastening one end of a spring 20, which supports the rear fork 15. The fastening is made by a clip 21. To the stem 19 is brazed a pair of blocks 22, which are shaped so as to form a flat surface against which the spring bears, and to which it is clamped by the clip 21, said clip extending under the spring, and passing around the tube, the two branches of the clip being provided with perforated ears through which a bolt 23 passes, whereby the clip is clamped to the stem. The clip is further secured by bolts 24 passing thereinto and into the blocks 22, and the spring is also further secured by a bolt 25, passing through the clip and into the spring. Adjacent to the outer end of the stem 19 is a pair of blocks 26, shaped similar to the blocks 22, on which the spring bears, and below the blocks 26 a bolt 27 extends across the branches of the rear stay 12. The spring extends between the blocks 26 and the bolt 27. The other end of the spring is connected by links 28 to the branches of the rear fork 15 at the rear end thereof, the ends of the links which are connected to the said branches being formed with spaced ears 29, between which extend lugs 30 on the branches, and by passing bolts through registering openings in said ears and lugs, a loose or pivotal connection between the said links and the fork branches is had. The ends of the links 28 adjacent the spring 20 are connected by a brace 30′, and a bolt 31, the latter passing through an eye at the end of the spring, whereby the connection between said spring and the links is made. On the brace 30′ are lugs 32, through which the bolt 31 passes, and between which lugs the end of the spring is received, whereby lateral play thereof is prevented.

The rear fork 15 is provided with a brace comprising a tube 33 extending between the branches thereof, and having at its ends oppositely presented arms 34, extending to and secured to said branches.

The rear stay 12 comprises a pair of tubes which are spaced apart to permit the spring 20 and the tube 33 to extend therebetween, and said tubes forming the stay 12 are connected to a brace 35, which engages the stem 19. The said branches of the rear stay extend below the rear fork 15, and are connected by a cross-piece 36, faced with a rubber or other cushion 37 on which the tube 33 rests. The cushion 37 serves to receive the vibratory shock of the frame in a direction opposite to that of the one sustained by the spring 20.

The spring 20 is a leaf spring, so that by putting on or taking off one or more of the leaves the spring can be adjusted to the weight of the rider.

The rear fork 15 is free to oscillate in a vertical plane, the center of oscillation being the crank shaft, by reason of which there will be no tightening or slacking of the drive chain or belt, and as the fork is spring-supported or suspended, jarring due to rough roads and streets is effectually eliminated, and the machine is comfortable to ride. The frame arranged and braced as herein described, makes a strong and durable structure. The seat post will be secured to the rear stay 12.

The spring need not be, necessarily, secured to the frame as herein described. Its manner of attachment will depend on the construction of the frame. I have shown one way of attaching it to the ordinary diamond frame, which can be readily altered as herein described to obtain a support for the spring. In other makes of frames, the spring may be secured in any suitable manner to the rear end thereof. The axis on which the rear fork swings must always coincide with the axis of the shaft of the drive pulley, in order that the drive chain or belt may not be tightened or slackened when the fork swings. I have shown the rear fork pivoted to the crank hanger, but in machines where the shaft of the drive pulley has its bearings elsewhere, the rear fork will be mounted accordingly.

What is claimed is:—

1. In a cycle frame, a rear fork pivoted to swing in a vertical plane, a spring to resist the upward movement of said fork, a rear stay, and a cushioning member carried by the stay and engageable by the fork to receive the vibratory shock of the frame in a direction opposite to that of the one sustained by the aforesaid spring.

2. In a cycle frame, a stem secured to the crank hanger thereof, and extending upwardly and rearwardly therefrom, a rear fork pivoted to swing in a vertical plane, a spring secured at one end to the aforesaid stem, and connected at the other end to the free end of the rear fork, a rear stay and a cushioning member carried by the stay, and engageable by the fork to receive the vibratory shock of the frame in a direction opposite to that of the one sustained by the aforesaid spring.

3. In a cycle frame, a stem secured to the crank hanger thereof, and extending rearwardly therefrom, a rear fork pivoted to swing in a vertical plane, a spring connected at one end to the aforesaid stem, and connected at the other end to the free end of the fork, a rear stay comprising spaced members between which the aforesaid stem and spring extend, and a cushioning member carried by the stay, and engageable by the fork to receive the vibratory shock of the frame in a direction opposite to that of the one sustained by the aforesaid spring.

4. In a cycle frame, a rear fork pivoted to swing in a vertical plane, a spring to resist the upward movement of said rear fork, a bar connected to and extending between the branches of the fork, a rear stay comprising spaced members between which the aforesaid bar is received, and a cushioning member carried by said members, and engageable by the bar to receive the vibratory shock of the frame in a direction opposite to that of the one sustained by the aforesaid spring.

In testimony that I claim the foregoing as my own, I have hereto affixed my signature in the presence of two witnesses.

CARL L. W. HUSER.

Witnesses:
   OSWALD HERRMANN,
   HENRY A. CARTER.